April 11, 1961  S. M. MacNEILLE  2,979,632
FIBER OPTICAL COMPONENTS AND METHOD OF MANUFACTURE
Filed Nov. 6, 1958

INVENTOR
STEPHEN M. MacNEILLE
BY Louis L. Gagnon
Noble D. Williams
ATTORNEYS

United States Patent Office 2,979,632
Patented Apr. 11, 1961

2,979,632

FIBER OPTICAL COMPONENTS AND METHOD OF MANUFACTURE

Stephen M. MacNeille, Thompson, Conn., assignor to American Optical Company, Southbridge, Mass., a voluntary association of Massachusetts Filed Nov. 6, 1958, Ser. No. 772,198

18 Claims. (Cl. 313—89)

This invention relates to improvements in kinescope tubes, oscilloscope tubes, cathode ray tubes and the like, and more particularly to improvements in the construction of face plate portions of and face plate components for such tubes. The invention also includes the method of manufacture of said tubes and face plate components.

In conventional kinescope picture tubes such as might be used for television picture viewing purposes, for example, the face plate portions thereof are made of glass in order to withstand high temperatures during the manufacture thereof and are of considerable thickness in order to withstand the appreciable inward pressure exerted thereon since these tubes in use are highly evacuated. Accordingly, there is an appreciable space or distance between the usual picture-producing fluorescent coating or screen upon the inner surface of the face plate portion of such a tube and the exterior surface thereof. It follows therefore that these tubes are restricted in certain respects as to the uses to which they may be put. For example, even though photographic prints of pictures appearing upon the fluorescent screen of the tube may be made by projection printing methods, nevertheless contact prints cannot be made satisfactorily by positioning a photosensitive film or paper in direct contact with the exterior surface of the face of the tube. This is mainly because of the excessive diffusion of light and loss of contrast which will occur in the print due to said spacing.

In order to transfer the image being formed on the fluorescent screen of a kinescope tube or the like from the inner surface of the face plate to the outer surface thereof, it has already been proposed, as disclosed in copending application Serial No. 736,172, to form the face plate portion of the tube of a very large number of slender individual coated tapered light-conducting fibers or filaments bunched together and fused in side-by-side parallel or nearly parallel relation to each other so as to produce an integral unitary optical image transfer device of appreciable size. The kinescope tube in application Serial No. 736,172, in fact, is shown in closely adjacent relation to a fiber optical image transfer device employing many individual light-conductive fibers of a larger size for conducting the image at the outer surface of the picture tube to a ground glass viewing screen or the like appreciable spaced therefrom.

It is an object of the present invention to provide in such a kinescope tube, or the like, employing multiple fiber optical image transfer means as the face plate portion thereof an improved construction and arrangement of parts whereby the optical efficiency and optical contrast characteristics of the image being transferred from the inner surface of the face plate portion to the outer surface thereof will be appreciably increased. As will be more fully explained hereinafter, this is accomplished by effecting an increase in the light acceptance angle of each individual fiber of the multiple fiber optical image transfer face plate or face plate component in accordance with the present invention.

It is also an object of the present invention to provide for use in a kinescope tube and the like, improved face plate components of a multiple fiber optical image transfer type with which increased light-conductive efficiency and image contrast may be obtained when incorporated in the tube. It is also an object of the invention to provide a method by which such improved face plate portions and components may be produced.

It is a further object of the invention to provide a multiple fiber optical image transfer face plate portion or component having the many individual round fibers thereof properly tapered and in limited contact with one another so as to give strength to the face plate and at the same time have said individual fibers otherwise surrounded by air; whereby a very high percentage of the peripheral surface of each fiber will be air spaced from adjacent fibers and a relatively high refractive index difference will exist between the glass surface of each fiber and the air in contact therewith. The result of such a construction is that a smaller angle of total internal reflection than has been possible by the use of coated fibers will be provided for each fiber and thus a greater light acceptance angle will be provided.

The invention also includes the method by which such improved face plate portions and components are made.

Other objects and advantages of the invention will become apparent from the detailed description which follows when taken in conjunction with the accompanying drawings in which.

An important use to which a kinescope-type tube, or the like, employing a multiple fiber optical image transfer face plate may be put is in photocopying by a direct contact method images being formed on the fluorescent screen of the tube and being transferred to the outer surface thereof by the fiber optical elements thereof. This is because much of the light forming each individual unit area of the picture image on the screen is separately transmitted by the many individual fibers of the face plate which have their opposite end areas closely adjacent the fluorescent screen and the exterior surface of the face plate respectively. It will be appreciated that the rapidity at which high speed television pictures, for example, may be copied depends not only upon the amount of light which can be made available at the fluorescent screen but also how efficiently this available light can be conducted by the individual fibers of the face plate to the exterior surface thereof. Furthermore, fluorescent screen images of low intensity or contrast may be more satisfactorily copied if the light-conducting efficiency of each individual fiber of the fiber optical face plate can be increased. It additionally follows that the more efficient such a face plate is in transmitting the light it receives, the better will be the contrast in different parts of the image being produced thereby since less of the received light will become "stray" light escaping from one fiber to another and causing deterioration in the final image.

As has already been indicated above, it is known that the face plate portion of a kinescope tube, or the like, may be formed by the use of a multiple fiber optical image transfer assembly or bundle in which each of the many fine fibers thereof are of high index transparent glass and are individually coated and separated from one another by a low index glass. This low index glass serves as optical insulation and insures good total internal reflecting characteristics insofar as the light travelling from one end of each fiber to the other is concerned; and this is so notwithstanding the fact that these coated fibers are tightly bunched and fused together to form a unitary structure which is impervious to the passage of air therethrough. The high index glass of such fibers might be, for example, in the neighborhood of 1.8 and the index of the glass cladding surrounding these fibers might be in the neighborhood of 1.5.

Such a kinescope tube using a fiber optical image transfer face plate would be coated on the inner surface thereof with a layer of fluorescent material so that this layer, when excited by the usual cathode-ray beam associated therewith, will fluoresce and the light of the image so produced thereby at the inner ends of the fibers will be conducted mainly by internal reflection along the individual fibers to the outer ends thereof. In this way a like image at the outer surface of the face plate will be formed.

Figure 4:
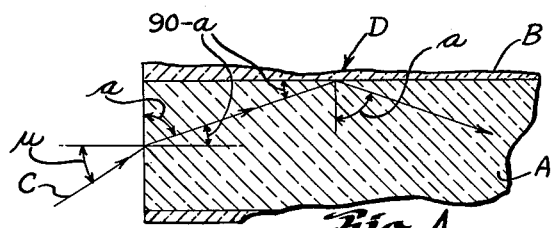
Fig. 4 is a diagrammatic sketch for use in more readily obtaining an understanding of the invention.

The amount of light internally reflected and conducted by each fiber of such a fiber optical bundle depends directly upon the value of the critical angle of total internal reflection which prevails in the fiber, and this may be taken as a measure of the acceptance angle of the fiber of the light it will transmit. Furthermore, this critical angle is, in turn, directly dependent upon the difference between the index of refraction of the fiber and the lower index of refraction of the glass or medium surrounding each fiber and serving as optical insulation therefor. The relationship is represented by Fig. 4 wherein an individual transparent fiber of high index material is indicated at A and a coating or surrounding material of lower refractive index is indicated at B. If it is considered that light ray C, which experiences an internal reflection at D, is so chosen that it will provide a critical angle of total internal reflection equal to an angular value $a$, then it will be seen that this ray will have, in entering the end of the fiber from the air, an angle of incidence equal to $u$ and this angle $u$ may be considered a measure of the maximum acceptance angle which will pass light by total internal reflection through the fiber from one end thereof to the other.

If $n_1$ is the refractive index of the glass of the fiber and $n_2$ is the refractive index of the material surrounding the fiber, then it can be shown that the acceptance angle is controlled by the relationship of these two indices as follows:

$$\sin (90-a) = \cos a$$
$$\sin u = n_1 \cos a$$
$$\cos a = \sqrt{1-\sin^2 a}$$
$$\sin u = n_1 \sqrt{1-\sin^2 a}$$
$$\sin^2 a = \frac{n_2^2}{n_1^2}$$
$$\sin u = n_1 \sqrt{1-\frac{n_2^2}{n_1^2}}$$
$$\sin u = \sqrt{n_1^2 - n_2^2}$$

Thus, if the value of the refractive index $n_2$ of the surrounding material can be reduced relative to the refractive index of the fiber, a greater acceptance angle will be provided. Or, stated differently, the amount of light or flux transmitted by the fibers of the fiber optical image transfer bundle will be proportional to the difference between the square of the refractive index $n_1$ of the fibers and the square of the refractive index $n_2$ of the surround.

$$\text{Flux} \sim n_1^2 - n_2^2$$

In the fiber optical face plate structure of earlier construction referred to above, if the refractive index of the glass fiber is 1.8 and the index of refraction of the material surrounding each fiber is 1.5 then:

$$\text{Flux} \sim 3.24 - 2.25 = 0.99$$

Figure 1:
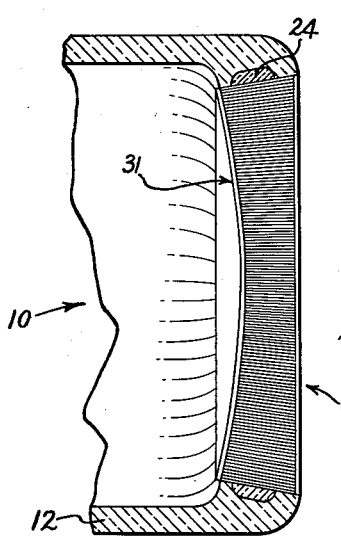
Fig. 1 is a longitudinal sectional view of a forward part of a kinescope tube, or the like, showing a multiple fiber optical image transfer face plate embodying the present invention.
Figure 2:
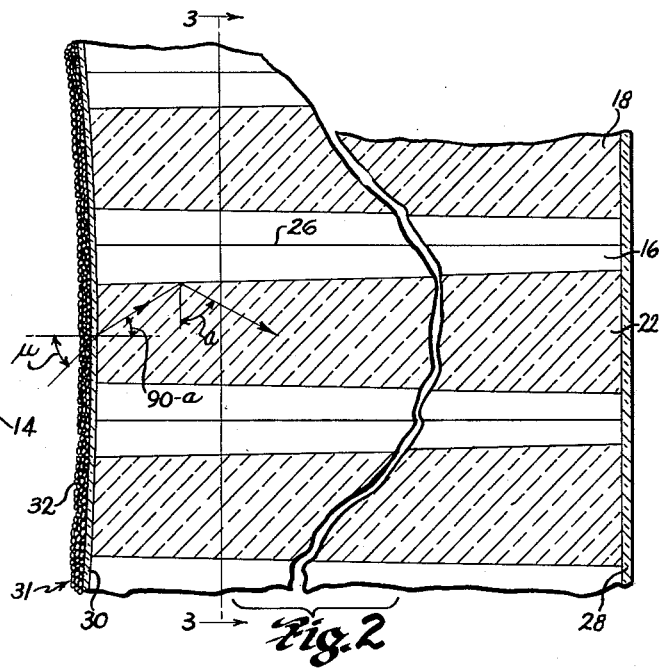
Fig. 2 is a fragmentary sectional view of a portion of the face plate of Fig. 1.
Figure 3:
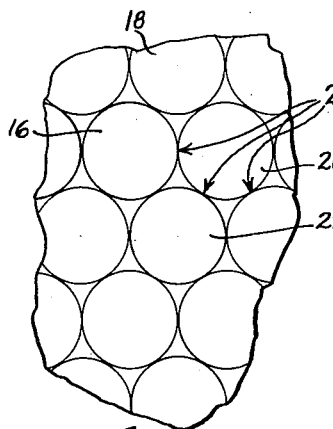
Fig. 3 is a sectional view taken substantially on section line 3—3 of Fig. 2 and looking in the direction of the arrows.

In Fig. 1, however, there is shown a forward portion of a kinescope tube 10 comprising a glass envelope 12 in the front face of which is permanently fused a face plate 14. This face plate, as better shown in Figs. 2 and 3, comprises a very large number of individual fibers of small diameter, such as fibers 16, 18, 20 and 22, positioned and bundled together in side-by-side contacting relation to each other so as to constitute an exposed face plate area of appreciable predetermined size. Since these fibers are bunched together and are to be held by external clamping means such as at 24, they will have substantially no more than line contact with each other at several spaced points as indicated at 26 around the peripheries thereof.

Thus, each fiber will have a relative large percentage of its peripheral area exposed to air and since the refractive index difference under such conditions will be appreciably greater than in the earlier glass clad fiber construction, a higher light transmitting efficiency will be obtained through each fiber. For such a condition wherein air mainly surrounds each fiber, the amount of light transmitted by unclad or air bounded fibers of the same refractive index will be as follows:

$$\text{Flux} \sim 3.24 - 1.00 = 2.24$$

Accordingly it will be seen that the amount of flux being transmitted can be more than doubled by the elimination of the low index glass cladding material for each fiber. This is so notwithstanding the fact that a slight amount of "cross talk" or diffusion of light from one fiber to the next may occur at points of contact.

Since the critical angle of total internal reflection $a$ is thus made to assume a lesser value by the use of air instead of low index glass as the surrounding medium, a greater amount of the total light which enters the end of each fiber will pass therethrough and thus less light will be available to cause "cross-talk" or light-leakage from one fiber into an adjacent fiber, better contrast between unit areas of different light intensities or contrast in the image will be produced.

When a face plate is made of many round fibers bundled together in this manner so as to be mostly surrounded by air and have no more than point or line contact with adjacent fibers, it is desirable to secure the fibers of each bundle together by external clamping means, such as the means 24 referred to above. This clamping means may be, for convenience, a preformed ring of metal or glass into which the assembled bundle of fibers is tightly forced, or it may be formed by a thin metallic wire being wound around tightly a number of times about the bundle and secured.

Since the completed face plate 14 is intended to serve as the front wall of an evacuated electron tube, it must be impervious to the passage of air therethrough, even though the individual fibers thereof are not physically bonded or attached to each other. Accordingly, it becomes necessary to seal off at least one face and preferably both faces of the face plate by means of very thin sheets or membranes of glass. Such a membrane need only be of sufficient thickness to withstand the inward pressure of the atmosphere and normal uses and conditions to which it will be subjected. While it might be possible to use only one such thin sheet or membrane of glass, for sealing off the air from the interior of the tube, it is preferable to use instead a pair of thin sheets or membranes of glass as indicated at 28 and 30 at the opposite ends of the fiber bundle since by so doing the outer membrane will close off the minute passageways among the fibers to dust and moisture and contamination and the inner membrane will form a good continuous surface upon which the fluorescent coating 32 may be deposited, while both will serve as air-sealing means for the fiber optical bundle.

It must also be appreciated that since such a face plate will have an appreciable total exposed area when in use and this exposed area will be subjected to a considerable inward pressure, and since this face plate comprising many clamped but unattached fibers will have considerably less strength than the fused together unitary face plate construction of coated fibers disclosed in said earlier application, it is desirable to provide a slight taper to each individual fiber of the bundle and to arrange the fibers so that the larger ends of the fibers face outwardly. The amount of taper which each fiber should have will be at least sufficient to provide in all of the fibers collectively a "masonry arch" type of construction which has enough of a flare or keystone effect to readily withstand the inward pressure of the atmosphere mentioned above.

The improved face plate or face plate component may be made in different ways as will presently appear and thereafter placed in the open end of a cathode ray tube envelope, or the like, and fused in place to produce the tube structure indicated at 10 in Fig. 1. While the inner face of the fiber optical image transfer face plate 14 has been shown as concavely curved and the outer face thereof indicated as flat for photographic film contacting purposes, it is possible to provide upon either or both faces of such an improved fiber optical face plate almost any shape desired as long as the masonry arch effect mentioned above is retained to give adequate physical strength to the assembly. The inner face, for example, may be formed to a specified curvature to facilitate focusing of the electron beam thereon. Likewise, the outer face may be convexly or concavely curved, if desired, when same is to be used for other purposes than contact printing.

A method by which improved face plates and components of the present invention may be made comprises the steps of first cladding as by a flashing process or the like, rods of low melting glass with thin layers or coatings of high melting glass. Preferably, both glasses should be high index glasses. Thereafter, the coated rods individually or collectively in bunched formation, are heated and drawn down to the cross-sectional size and taper desired and cut to length. Then many tapered lengths are stacked together to form an image transfer face plate of the size or area needed. The bundle of taper fibers so assembled, with the larger ends of all of the fibers facing generally in the same direction, is then tightly clamped by the clamping means 24. The opposite faces of the bundle would then be ground to the exact curvatures or shapes desired.

The thin membranes 28 and 30 of low melting glass are next fused to the low melting core portions of all of the fibers forming the face plate at a temperature below the softening temperature of the cladding glass. In this way, an integral bond between each membrane and the many individual cores can be effected without having the claddings soften and deform so as to cause more extensive areas of contact between adjacent fibers. Thus, "cross talk" between fibers is kept at a minimum. Of course, after this the fluorescent screen material 14 will be applied thereto and the face plate will be fused in place in the end of tube envelope 12.

When clad fibers are used, it is desirable to use as the cladding material a glass having a lower coefficient of thermal expansion than the core material. After the assembly cools, the cladding is then in compression and is more resistant to clamping pressures.

Figure 5:
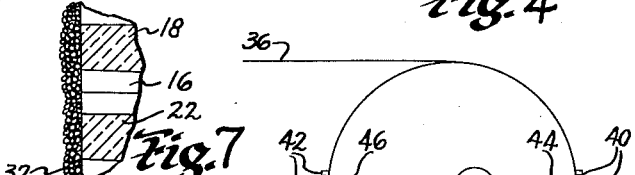
Fig. 5 is a sketch of the apparatus which may be used in the forming of tapered fibers.

Another method by which the improved face plates and face plate components of the present invention may be made comprises the steps of first heating an end portion of a rod of high index glass, as by use of an electrical heating ring or the like (not shown) and drawing down a relatively thin flexible fiber which, as shown at 36 in Fig. 5, may be secured to a winding drum or mandrel 38 rotatably mounted in a lathe or the like. Such an arrangement is much like that disclosed in co-pending application Serial No. 703,914, except that in the present invention the mandrel 38 will be somewhat eccentrically mounted, as indicated by the difference in lengths between its minimum and maximum deviations $r$ and $r_1$. It follows, accordingly, that a fast rate of draw and then a slow rate of draw will be provided the fiber during each complete revolution of the mandrel while being turned at a constant speed and thus one thick cross section and one thin cross section will be provided at diametrically opposite points on the mandrel for each convolute thereon. Also tapering cross sections will be contained between each thin and thick section.

The eccentric mandrel 38 is provided with two cutting grooves 44 and 46 diametrically arranged at the "high" and "low" points of the mandrel, and in order to have the thick sections and the thin sections of the convolutes of the drawn fiber overlie a cutting groove, the free distance from the heating ring to the mandrel may be increased or decreased slightly. The lateral travel of the lathe carriage carrying the guide shoe guiding the fiber 36 being laid on the mandrel will be adjusted so as to equal the thickest cross sections of the fiber. This will cause all of the thick sections to be positioned in side-by-side contacting relation to each other. After a single layer of desired width has been wound, the thinner sections on the mandrel are hand-pushed or otherwise urged sidewise into contacting relation with each other; and such is not difficult to accomplish.

The convolutes are then glued together to form, in effect, a tapered sheet or ribbon of fibers after which two bars 40 and two bars 42 (like the ones employed in application No. 703,914) are glued or cemented to the fibers at opposite sides of each cutting groove. When the glue has set, the convolutes are cut along the two grooves and two tapered sheets of side-by-side tapered fibers are then peeled off the mandrel. The tapered sheets are then stacked one on another, in a manner similar to that disclosed in application No. 703,914, and glued together in proper alignment by a free-burning cement. A suitable cement of this type is cellulose nitrate. This stacking of layers is continued until a stack or bundle of the required thickness is obtained.

Figure 6:
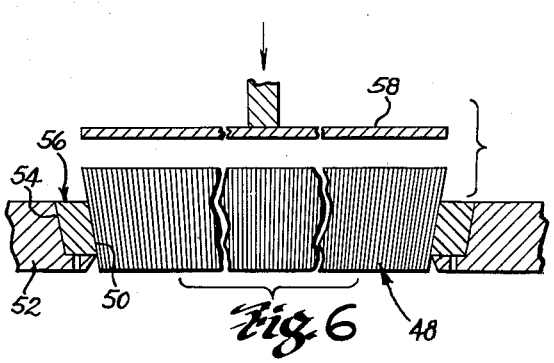
Fig. 6 is a sectional view of means for use in the production of face plate components.

An assembled glued-up bundle, such as shown at 48 in Fig. 6, is then placed in a tapered opening 50 of proper size and shape in a support 52, which may also be recessed as indicated at 54 to accommodate a clamping ring or the like 56 similarly provided on its inner surface with a taper. When this assembly is heated, the glue can be burned away completely. During this step, the bundle will be firmly pressed downwardly by a pusher 58 so that it will be firmly clamped by the ring 56. This burning-away procedure will leave the side wall surfaces of the individual tapered fiber entirely clean and exposed to air except at spaced points where line contact between adjacent fibers occurs. Of course, subsequently the bundle 48 with the clamping ring 56 in place will be removed from the support.

The opposite faces of the bundle would then be ground to whatever shape is desired. The next step would be that of placing a thin membrane of low melting glass to each face of the bundle and applying an intense heat to the outer surface thereof for a time sufficient to cause each membrane to fuse to the ends of the fibers; care being taken to avoid softening and deformation of the fibers at locations inwardly of their ends.

A method of forming an improved face plate component of the type herein disclosed would comprise first forming a plurality of high index glass rods with thin layers of glass cladding thereon, and which cladding glass is of a type which may be easily etched away without appreciable effect upon the glass forming the rods. The clad rods are placed in side-by-side relation to each other within an outer envelope of a high index glass and heated at its lower end to a softening temperature. Thereafter, the entire assembly is drawn down to a taper of desired degree in much the same manner as that used in copending application Serial No. 669,883, to form a tapered multiple fiber bundle.

Care should be taken to avoid as much as possible any fusing between adjacent fibers during this drawing-down step. This can be accomplished by careful control of the temperature of the glass being drawn, for too high a temperature will tend to cause fusion between fibers. It has even been found advisable to employ a slight air pressure at the outer ends of the envelope enclosing the rods during drawing to help lessen the tendency for fusion between fibers. A glass suitable for forming the cladding of this type is a high borax borasilicate glass; and it may be etched away by the use of hydrochloric acid bath. The fibers, on the other hand, may be formed of a more common form of glass, such as an ordinary crown or Pyrex type glass.

After the tapered bundle of tapered fibers is formed and the desired air spaces produced therein by etching, the thin membranes of low melting glass may be fused to the opposite ends of the fibers, as already described, by the use of intense heat at the outer faces of the membranes for short periods of time.

Figure 7:
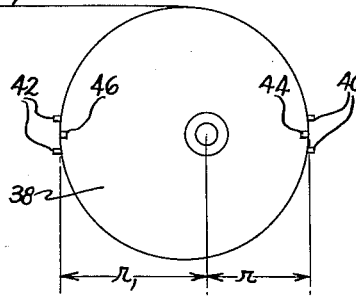
Fig. 7 is a fragmentary sectional view similar to Fig. 2 but showing a modified form of the invention.

It has been mentioned above that a single membrane of glass or a pair of these membranes 28 and 30 may be used to seal the fiber bundle to the passage of air therethrough. If only one membrane is used, it may be disposed on either face. If disposed on the outer face, one distinct advantage will be gained due to the fact that the fluorescent material will be deposited (Fig. 7) directly upon the finished inner ends of the fibers. Thus, more light emanating from each individual point in the fluorescent material will tend to enter the fiber supporting the material instead of spreading to other adjacent fibers. If desired, the outer sealing layer might be made somewhat thicker than the inner layer without detrimentally effecting the image resolution, and might even be formed of plastic rather than glass. Preferably, it would be cemented to the fiber bundle after all fusing steps have been completed.

It will thus be seen that the objects set forth above and those made apparent from the preceding description are attained and, since certain changes may be made in the described constructions without departing from the spirit of the invention, it is intended that all matter contained in the above description or shown in the accompanying drawings shall be interpreted as illustrative and not in a limiting sense.

Having described my invention, I claim:

1. A cathode ray tube envelope or the like having a face plate integrally forming a wall portion thereof, said face plate being formed of a very large number of relatively long thin tapered fibers of small diameter and substantially circular cross-section, said fibers being formed of a transparent material of a relatively high refractive index and disposed in side-by-side contacting relation to each other so as to constitute a compactly arranged bundle having a very large number of elongated air spaces each enclosed by a plurality of adjacent fibers, the larger ends of all of said tapered fibers facing in an outward direction so that said bundle will have in each and every section in parallel relation to said fibers a keystone shape, whereby only a very small part of the total peripheral side wall area of each fiber will have contact with adjacent fibers while the remaining side wall area thereof will be air-spaced from adjacent fibers, means surrounding said bundle of fibers and securing all of said fibers in tightly clamped relation to each other, and a relatively thin membrane of transparent material disposed in overlying relation to the ends of all of the fibers of said bundle at one face thereof and bonded to said fiber ends and to said envelope in such a manner as to render the face plate and said envelope impervious to the passage of air therethrough, the thickness and taper of said bundle of fibers in comparison to the external face plate forming area thereof being such as to enable said face plate to withstand the inward pressure of the atmosphere which will be normally exerted thereon.

2. A cathode ray tube envelope or the like having a face plate integrally forming a wall portion thereof, said face plate being formed of a very large number of relatively long thin tapered fibers of small diameter and substantially circular cross-section, said fibers being formed of a transparent material of a relatively high refractive index and disposed in side-by-side line-contacting relation to each other so as to constitute a compactly arranged bundle having a very large number of elongated air spaces each enclosed by a plurality of adjacent fibers, the larger ends of all of said tapered fibers facing in an outward direction so that said bundle will have in each and every section in parallel relation to said fibers a keystone shape, whereby only a very small part of the total peripheral side wall area of each fiber will have contact with adjacent fibers while the remaining side wall area thereof will be air-spaced from adjacent fibers, means surrounding said bundle of fibers and securing all of said fibers in tightly clamped relation to each other, a layer of fluorescent material disposed directly upon the inner ends of all said fibers, and a relatively thin membrane of transparent material disposed in overlying relation to the opposite ends of all of the fibers of said bundle and secured thereto and to said envelope in such a manner as to render the face plate and said envelope impervious to the passage of air therethrough, the thickness and taper of said bundle of fibers in comparison to the external face plate forming area thereof being such as to enable said face plate to withstand the inward pressure of the atmosphere which will be normally exerted thereon.

3. A cathode ray tube envelope or the like having a face plate integrally forming a wall portion thereof, said face plate being formed of a very large number of relatively long thin tapered fibers of small diameter and substantially circular cross-section, said fibers being formed of a transparent material of a relatively high refractive index and disposed in side-by-side line-contacting relation to each other so as to constitute a compactly arranged bundle having a very large number of elongated air spaces each enclosed by a plurality of adjacent fibers, the larger ends of all of said tapered fibers facing in an outward direction so that said bundle will have in each and every section in parallel relation to said fibers a keystone shape, whereby only a very small part of the total peripheral side wall area of each fiber will have contact with adjacent fibers while the remaining side wall area thereof will be air-spaced from adjacent fibers, means surrounding said bundle of fibers and securing all of said fibers in tightly clamped relation to each other, a relatively thin membrane of transparent material disposed in overlying relation to the ends of all of the fibers of said bundle at the inner face thereof and secured to said fiber ends and to said envelope in such a manner as to render the face plate and said envelope impervious to the passage of air therethrough, a layer of fluorescent material disposed upon said thin membrane, and a layer of transparent material secured to the outer ends of said fibers and serving to exclude foreign matter from the spaces between said adjacent fibers, the thickness and taper of said bundle of fibers in comparison to the external face plate forming area thereof being such as to enable said face plate to withstand the inward pressure of the atmosphere normally exerted thereon.

4. An optical component for use in forming the face plate portion of a cathode ray tube envelope or the like, said component comprising a very large number of relatively long thin tapered fibers of small diameter and substantially circular cross-section, said fibers being formed of a transparent material of a relatively high refractive index and disposed in side-by-side contacting relation to each other so as to constitute a compactly arranged bundle of predetermined size and shape having a very large number of elongated air spaces each enclosed by a plurality of adjacent fibers, the larger end of all of said tapered fibers facing in the same direction so that said bundle will have in each and every section in parallel relation to said fibers a keystone shape, whereby only a very small part of the total peripheral side wall area of each fiber will have contact with adjacent fibers while the remaining side wall area thereof will be air-spaced from adjacent fibers, means surrounding said bundle of fibers and securing all of said fibers in tightly clamped relation to each other, and a relatively thin membrane of transparent material disposed in overlying relation to the ends of all of the fibers of said bundle at one face thereof and bonded to said fiber ends in such a manner as to render said component impervious to the passage of air therethrough, the thickness and taper of said bundle of fibers in comparison to the external face plate forming area thereof being such as to enable said face plate when subsequently employed as a wall portion of said tube envelope to withstand the inward pressure of the atmosphere normally exerted thereon.

5. An optical component for use in forming the face plate portion of a cahode ray tube envelope or the like, said component comprising a very large number of relatively long thin tapered fibers of small diameter and substantially circular cross-section, said fibers being formed of a transparent material of a relatively high refractive index and disposed in side-by-side contacting relation to each other so as to constitute a compactly arranged bundle of predetermined size and shape having a very large number of elongated air spaces each enclosed by a plurality of adjacent fibers, the larger end of all of said tapered fibers facing in the same direction so that said bundle will have in each and every section in parallel relation to said fibers a keystone shape, whereby only a very small part of the total peripheral side wall area of each fiber will have contact with adjacent fibers while the remaining side wall area thereof will be air-spaced from adjacent fibers, means surrounding said bundle of fibers and securing all of said fibers in tightly clamped relation to each other, a layer of fluorescent material disposed directly upon the inner ends of all of said fibers, and a relatively thin membrane of transparent material disposed in overlying relation to the opposite ends of all of the fibers of said bundle and secured thereto in such a manner as to render said component impervious to the passage of air therethrough, the thickness and taper of said bundle of fibers in comparison to the external face plate forming area thereof being such as to enable said face plate when subsequently employed as a wall portion of said tube envelope to withstand the inward pressure of the atmosphere normally exerted thereon.

6. An optical component for use in forming the face plate portion of a cathode ray tube envelope or the like, said component comprising a very large number of relatively long thin tapered fibers of small diameter and substantially circular cross-section, said fibers being formed of a transparent material of a relatively high refractive index and disposed in side-by-side contacting relation to each other so as to constitute a compactly arranged bundle of predetermined size and shape having a very large number of elongated air spaces each enclosed by a plurality of adjacent fibers, the larger end of all of said tapered fibers facing in the same direction so that said bundle will have in each and every section in parallel relation to said fibers a keystone shape, whereby only a very small part of the total peripheral side wall area of each fiber will have contact with adjacent fibers while the remaining side wall area thereof will be air-spaced from adjacent fibers, means surrounding said bundle of fibers and securing all of said fibers in tightly clamped relation to each other, a relatively thin membrane of transparent material disposed in overlying relation to the ends of all of the fibers of said bundle at the inner face thereof and secured to said fiber ends in such a manner as to render said component impervious to the passage of air therethrough, a layer of fluorescent material disposed upon said thin membrane and a layer of transparent material secured to the outer ends of said fibers and serving to exclude foreign matter from the spaces between said adjacent fibers, the thickness and taper of said bundle of fibers in comparison to the external face plate forming area thereof being such as to enable said face plate when subsequently employed as a wall portion of said tube envelope to withstand the inward pressure of the atmosphere normally exerted thereon.

7. The method of manufacture of optical image transfer components for use in forming the face plate portions of cathode ray tubes or the like, said method comprising forming a very large number of relatively long thin tapered substantially circular fibers of transparent material, positioning said fibers in side-by-side substantially line-contacting relation to each other so as to form a bundle of predetermined size and shape having a very large number of unobstructed spaces between parts of adjacent fibers thereof, and with the large ends of all of said fibers facing in the same general direction so as to provide for all cross sections of said bundle parallel to said fibers a keystone shape, firmly pressing and securing all of said fibers in tight engagement with each other, grinding the ends of the fibers of said bundle at at least one face thereof so as to form approximately a predetermined surface shape thereon, positioning a layer of transparent material in overlying relation to the ground ends of said fibers, and securing said layer to said ground ends in such a manner as to render said bundle impervious to the passage of air therethrough.

8. The method of manufacture of optical image transfer components for use in forming the face plate portions of cathode ray tubes or the like, said method comprising forming a very large number of relatively long thin tapered substantially circular fibers of transparent material, positioning said fibers in side-by-side substantially line-contacting relation to each other so as to form a bundle of predetermined size and shape having a very large number of unobstructed spaces between parts of adjacent fibers thereof, and with the large ends of all of said fibers facing in the same general direction so as to provide for all cross sections of said bundle parallel to said fibers a keystone shape, firmly pressing and securing all of said fibers in tight engagement with each other, grinding the ends of the fibers of said bundle at the inner face thereof so as to form approximately a predetermined surface shape thereon, positioning a layer of transparent material in overlying relation to the ground ends of said fibers, and securing said layer to the ground ends of said fibers in such a manner as to render said bundle impervious to the passage of air therethrough.

9. The method of manufacture of optical image transfer components for use in forming the face plate portions of cathode ray tubes or the like, said method comprising forming a very large number of relatively long thin tapered substantially circular fibers of transparent material, positioning said fibers in side-by-side substantially line-contacting relation to each other so as to form a bundle of predetermined size and shape having a very large number of unobstructed spaces between parts of adjacent fibers thereof, and with the large ends of all of said fibers facing in the same general direction so as to provide for all cross sections of said bundle parallel to said fibers a keystone shape, firmly pressing and securing all of said fibers in tight engagement with each other, grinding the inner ends of the fibers of said bundle and the outer ends thereof so as to form approximately predetermined surface shapes thereon, depositing a layer of fluorescent material directly upon the inner ends of said fibers, positioning a layer of transparent material in overlying relation to the outer ends of said fibers, and securing said layer of transparent material to the adjacent ends of the fibers in such a manner as to render said bundle impervious to the passage of air therethrough.

10. The method of manufacture of optical image transfer components for use in forming the face plate portions of cathode ray tubes or the like, said method comprising coating a rod of low melting glass with a relatively thin layer of high melting glass, drawing said coated rod down in such a manner as to successively form a plurality of relatively long thin tapered substantially circular fibers of glass each having a high melting cladding surrounding a low melting core, repeating the process until a very large number of similar tapered coated fibers are formed, positioning said fibers in side-by-side substantially line-contacting relation to each other so as to form a bundle of predetermined size and shape having a very large number of unobstructed spaces between parts of adjacent fibers thereof, and with the large ends of all of said fibers facing in the same general direction, thereby providing for each and every cross section of said bundle parallel to said fibers a keystone shape, firmly pressing and securing said fibers in tight engagement with each other, grinding the ends of the fibers of said bundle at at least one face thereof so as to form approximately a predetermined surface shape thereon, positioning a layer of low melting transparent glass in overlying relation to the ground ends of said fibers, and heating said layer of glass and said fibers to a temperature above the melting temperature of said layer and said cores and below the melting temperature of said cladding so as to fuse the adjacent ends of said cores to said layer of glass and render said bundle impervious to the passage of air therethrough.

11. The method of manufacture of optical image transfer components for use in forming the face plate portions of cathode ray tubes or the like, said method comprising coating a rod of low melting glass with a relatively thin layer of high melting glass, drawing said coated rod down in such a manner as to successively form a plurality of relatively long thin tapered substantially circular fibers of glass each having a high melting cladding surrounding a low melting core, repeating the process until a very large number of similar tapered coated fibers are formed, positioning said fibers in side-by-side substantially line-contacting relation to each other so as to form a bundle of predetermined size and shape having a very large number of unobstructed spaces between parts of adjacent fibers thereof, and with the large ends of all of said fibers facing in the same general direction, thereby providing for each and every cross section of said bundle parallel to said fibers a keystone shape, firmly pressing and securing said fibers in tight engagement with each other, grinding the ends of the fibers of said bundle at each face thereof so as to form approximately predetermined surface shapes thereon, positioning a layer of low melting transparent glass in overlying relation to the ground ends of said fibers at the outer ends thereof, heating said layer of glass and said fibers to a temperature above the melting temperature of said layer and said cores and below the melting temperature of said cladding so as to fuse the adjacent ends of said cores to said layer of glass and render said bundle impervious to the passage of air therethrough, and depositing a layer of fluorescent material directly upon the inner ends of said fibers.

12. The method of manufacture of optical image transfer components for use in forming the face plate portions of cathode ray tubes or the like, said method comprising coating a rod of low melting glass with a relatively thin layer of high melting glass, drawing said coated rod down in such a manner as to successively form a plurality of relatively long thin tapered substantially circular fibers of glass each having a high melting cladding surrounding a low melting core, repeating the process until a very large number of similar tapered coated fibers are formed, positioning said fibers in side-by-side substantially line-contacting relation to each other so as to form a bundle of predetermined size and shape having a very large number of unobstructed spaces between parts of adjacent fibers thereof, and with the large ends of all of said fibers facing in the same general direction, thereby providing for each and every cross section of said bundle parallel to said fibers a keystone shape, firmly pressing and securing said fibers in tight engagement with each other, grinding the ends of the fibers of said bundle at each face thereof so as to form approximately predetermined surface shapes thereon, positioning a thin membrane of low melting transparent glass in overlying relation to the ground ends of said fibers at the inner ends thereof, heating said membrane of glass and said fibers to a temperature above the melting temperature of said membrane and said cores and below the melting temperature of said cladding so as to fuse the adjacent ends of said cores to said membrane of glass and render said bundle impervious to the passage of air therethrough, depositing a layer of fluorescent material upon said membrane, and securing a layer of transparent material in overlying relation to the outer ends of said fibers so as to exclude foreign matter from the spaces between adjacent fibers.

13. The method of manufacture of optical image transfer components for use in forming the face plate portions of cathode ray tubes or the like, said method comprising forming a plurality of relatively long thin tapered substantially circular fibers of glass, positioning said fibers together in side-by-side substantially line-contacting relation to each other and gluing same together to form a tapered sheet of fibers, repeating the process until a sufficient number of tapered sheets of fibers are formed, positioning and gluing one tapered sheet of fibers in generally parallel relation to and upon another until a tapered bundle of predetermined size and shape and having the larger ends of all of its fibers facing in the same general direction is formed, firmly pressing said bundle of fibers into peripheral clamping means and firmly together while heating said bundle to burn away the glue securing adjacent fibers together to thereby provide a very large number of unobstructed spaces between parts of the adjacent fibers thereof, positioning a layer of transparent material in overlying relation to the ends of all of said fibers at one face of said bundle, and securing said layer to the adjacent ends of said fibers in such a manner as to render said bundle impervious to the passage of air therethrough.

14. The method of manufacture of optical image transfer components for use in forming the face plate portions of cathode ray tubes and the like, said method comprising forming a plurality of relatively long thin tapered substantially circular fibers of glass, positioning said fibers together in side-by-side substantially line-contacting relation to each other and gluing same together to form a tapered sheet of fibers, repeating the process until a sufficient number of tapered sheets of fibers are formed, repeatedly gluing one tapered sheet of fibers in generally parallel relation to and upon another until a tapered bundle of predetermined size and shape and having the larger ends of all of its fibers facing in the same direction is formed, firmly pressing said bundle of fibers into peripheral clamping means and firmly together while heating said bundle to burn away the glue securing adjacent fibers together to thereby provide a very large number of unobstructed spaces between parts of the adjacent fibers thereof, grinding the ends of the fibers at both faces of said bundle so as to form approximately predetermined surface shapes thereon, positioning a thin layer of low melting glass in overlying relation to the outer ends of the fibers of said bundle fusing said layer to said bundle so as to render said bundle impervious to the passage of air therethrough, and depositing a layer of fluorescent material directly upon the inner ends of said fibers.

15. The method of manufacture of optical image transfer components for use in forming the face plate portions of cathode ray tubes and the like, said method comprising forming a plurality of relatively long thin tapered substantially circular fibers of glass, positioning said fibers together in side-by-side substantially line-contacting relation to each other and gluing same together to form a tapered sheet of fibers, repeating the process until a sufficient number of tapered sheets of fibers are formed, repeatedly gluing one tapered sheet of fibers in generally parallel relation to and upon another until a tapered bundle of predetermined size and shape and having a larger ends of all of its fibers facing in the same general direction is formed, firmly pressing said bundle of fibers together while heating said bundle to burn away the glue securing adjacent fibers together to thereby provide a very large number of unobstructed spaces between parts of the adjacent fibers thereof, grinding the inner ends of the fibers of said bundle so as to form approximately a predetermined surface shape thereon, positioning a thin membrane of low melting glass in overlying relation to the inner ends of the fibers, fusing said membrane to the adjacent ends of said fibers to render said bundle impervious to the passage of air therethrough, and depositing upon the exposed face of said membrane a layer of fluorescent material.

16. The method of manufacture of optical image transfer components for use in forming the face plate portions of cathode ray tubes or the like, said method comprising coating a rod of low melting acid-resistant glass with a relatively thin layer of readily etchable glass, drawing said coated rod down in such a manner as to successively form a plurality of relatively long thin tapered substantially circular fibers of glass each having an etchable glass cladding surrounding a resistant low melting core, repeating the process until a very large number of similar tapered coated fibers are formed, positioning said fibers in side-by-side substantially line-contacting relation to each other so as to form a bundle of somewhat larger size than the predetermined size required for said face plate, and with the large ends of all of said fibers facing in the same general direction, thereby providing for each and every cross section of said bundle parallel to said fibers a keystone shape, firmly and continuously pressing said fibers in tight engagement with each other while subjecting said bundle to an acid-etching bath for a time sufficient to remove substantially all of said cladding to thereby provide a very large number of unobstructed spaces between parts of the adjacent fibers thereof, securing all of said fibers in tightly clamped relation to each other, grinding the ends of the fibers of said bundle at at least one face thereof so as to form approximately a predetermined surface shape thereon, positioning a layer of low melting transparent glass in overlying relation to the ground ends of said fibers, and heating said layer of glass and said fibers to a temperature sufficient to soften said layer and cause same to fuse to said cores and render said bundle impervious to the passage of air therethrough.

17. The method of manufacture of optical image transfer components for use in forming the face plate portions of cathode ray tubes or the like, said method comprising coating a rod of low melting acid-resistant glass with a relatively thin layer of readily etchable glass, drawing said coated rod down in such a manner as to successively form a plurality of relatively long thin tapered substantially circular fibers of glass each having an etchable glass cladding surrounding a resistant low melting core, repeating the process until a very large number of similar tapered coated fibers are formed, positioning said fibers in side-by-side substantially line-contacting relation to each other so as to form a bundle of somewhat larger size than the predetermined size required for said face plate, and with the large ends of all of said fibers facing in the same general direction, thereby providing for each and every cross section of said bundle parallel to said fibers a keystone shape, firmly and continuously pressing said fibers in tight engagement with each other while subjecting said bundle to an acid-etching bath for a time sufficient to remove substantially all of said cladding to thereby provide a very large number of unobstructed spaces between parts of the adjacent fibers thereof, securing all of said fibers in tightly clamped relation to each other, grinding the ends of the fibers of said bundle at each face thereof so as to form approximately predetermined surface shapes thereon, positioning a layer of low melting transparent glass in overlying relation to the ground ends of said fibers at the outer ends thereof, heating said layer of glass and said fibers to a temperature sufficient to soften said layer and cause same to fuse to said cores and render said bundle impervious to the passage of air therethrough, and depositing a layer of fluorescent material directly upon the inner ends of said fibers.

18. The method of manufacture of optical image transfer components for use in forming the face plate portions of cathode ray tubes or the like, said method comprising coating a rod of low melting acid-resistant glass with a relatively thin layer of readily etchable glass, drawing said coated rod down in such a manner as to successively form a plurality of relatively long thin tapered substantially circular fibers of glass each having an etchable glass cladding surrounding a resistant low melting core, repeating the process until a very large number of similar tapered coated fibers are formed, positioning said fibers in side-by-side substantially line-contacting relation to each other so as to form a bundle of somewhat larger size than the predetermined size required for said face plate, and with the large ends of all of said fibers facing in the same general direction, thereby providing for each and every cross section of said bundle parallel to said fibers a keystone shape, firmly and continuously pressing said fibers in tight engagement with each other while subjecting said bundle to an acid-etching bath for a time sufficient to remove substantially all of said cladding to thereby provide a very large number of unobstructed spaces between parts of the adjacent fibers thereof, securing all of said fibers in tightly clamped relation to each other, grinding the ends of the fibers of said bundle at each face thereof so as to form approximately predetermined surface shapes thereon, positioning a thin membrane of low melting transparent glass in overlying relation to the ground ends of said fibers at the inner ends thereof, heating said membrane of glass and said fibers to a temperature sufficient to soften said membrane and cause same to fuse to said cores and render said bundle impervious to the passage of air therethrough, depositing a layer of fluorescent material upon said membrane, and securing a layer of transparent material in overlying relation to the outer ends of said fibers so as to exclude foreign matter from the spaces between adjacent fibers.

References Cited in the file of this patent

UNITED STATES PATENTS

| | | |
|---|---|---|
| 2,055,593 | Reynolds | Sept. 29, 1936 |
| 2,091,152 | Malpica | Aug. 24, 1937 |
| 2,122,750 | Nicolson | July 5, 1938 |
| 2,160,081 | Niclassen | May 30, 1939 |
| 2,354,591 | Goldsmith | July 25, 1944 |
| 2,510,106 | Henroteau | June 6, 1950 |
| 2,751,320 | Jacobs et al. | June 19, 1956 |
| 2,786,793 | Shobert | Mar. 26, 1957 |